Oct. 14, 1952 — H. S. DIEBEL — 2,613,649
STEERING MOTOR FOR AIRPLANE LANDING WHEELS
Filed Oct. 22, 1948 — 4 Sheets-Sheet 1

INVENTOR
HENRY S. DIEBEL
BY
ATTORNEY

Oct. 14, 1952     H. S. DIEBEL     2,613,649
STEERING MOTOR FOR AIRPLANE LANDING WHEELS
Filed Oct. 22, 1948     4 Sheets-Sheet 2

INVENTOR
HENRY S. DIEBEL
BY
ATTORNEY

Oct. 14, 1952     H. S. DIEBEL     2,613,649
STEERING MOTOR FOR AIRPLANE LANDING WHEELS
Filed Oct. 22, 1948     4 Sheets-Sheet 3

INVENTOR
HENRY S. DIEBEL
BY
ATTORNEY

Oct. 14, 1952  H. S. DIEBEL  2,613,649
STEERING MOTOR FOR AIRPLANE LANDING WHEELS
Filed Oct. 22, 1948  4 Sheets—Sheet 4

INVENTOR
HENRY S. DIEBEL
BY
ATTORNEY

Patented Oct. 14, 1952

2,613,649

UNITED STATES PATENT OFFICE 2,613,649

STEERING MOTOR FOR AIRPLANE LANDING WHEELS

Henry S. Diebel, Downey, Calif., assignor to G. G. Bakewell, Pasadena, Calif.

Application October 22, 1948, Serial No. 55,904

7 Claims. (Cl. 121—41)

This invention relates to steering means for airplane landing wheels.

One object of the invention is to provide steering means for airplane landing wheels. Another object is to provide hydraulic motor means, with dampener means, for controlling a steerable airplane landing wheel. Another object is to provide an hydraulic steering motor for an airplane wheel which is operable by the pilot and which is adapted to utilize the hydraulic pressure system which is provided on airplanes for other hydraulic controls. A further object is to provide a steerable castered airplane wheel with hydraulic dampening means to prevent shimmying or oscillation.

These and other objects are attained by my invention which will be understood from the following description and the accompanying drawings in which.

Figure 1:
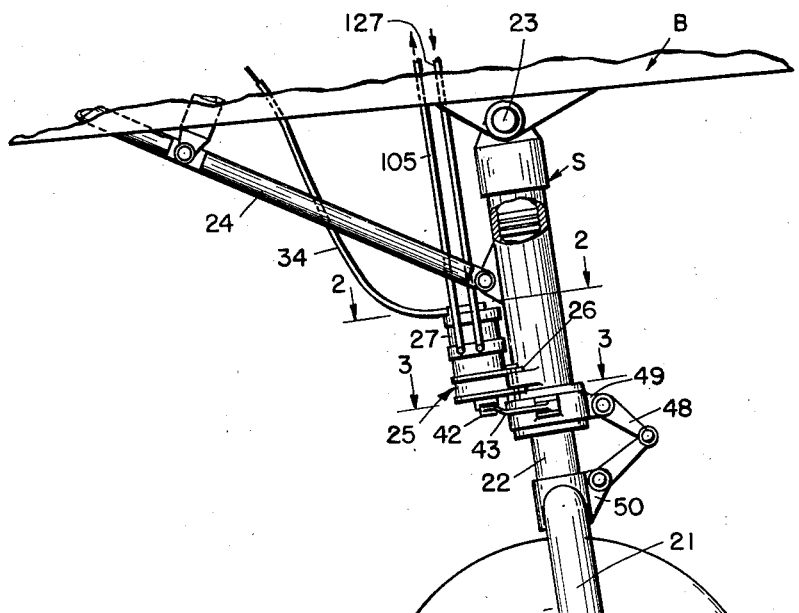
Figure 1 is a side elevational view showing a steering wheel supporting structure and its connection with an airplane body and including my improved steering motor.
Figure 2:
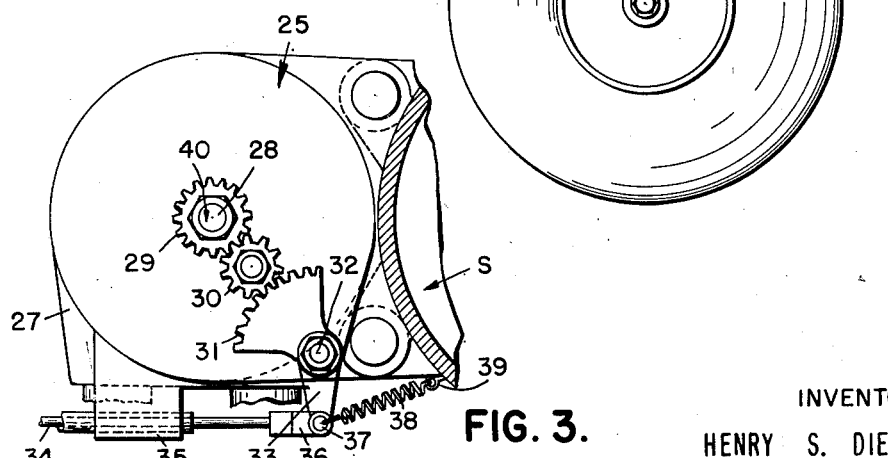
Figure 2 is a top plan view of my steering motor and dampener taken from the position 2—2 of Figure 1.
Figure 3:
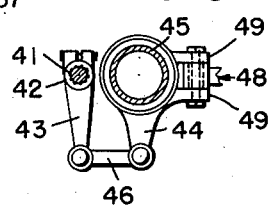
Figure 3 is a cross-sectional view taken on the line 3—3 of Figure 1.
Figure 4:
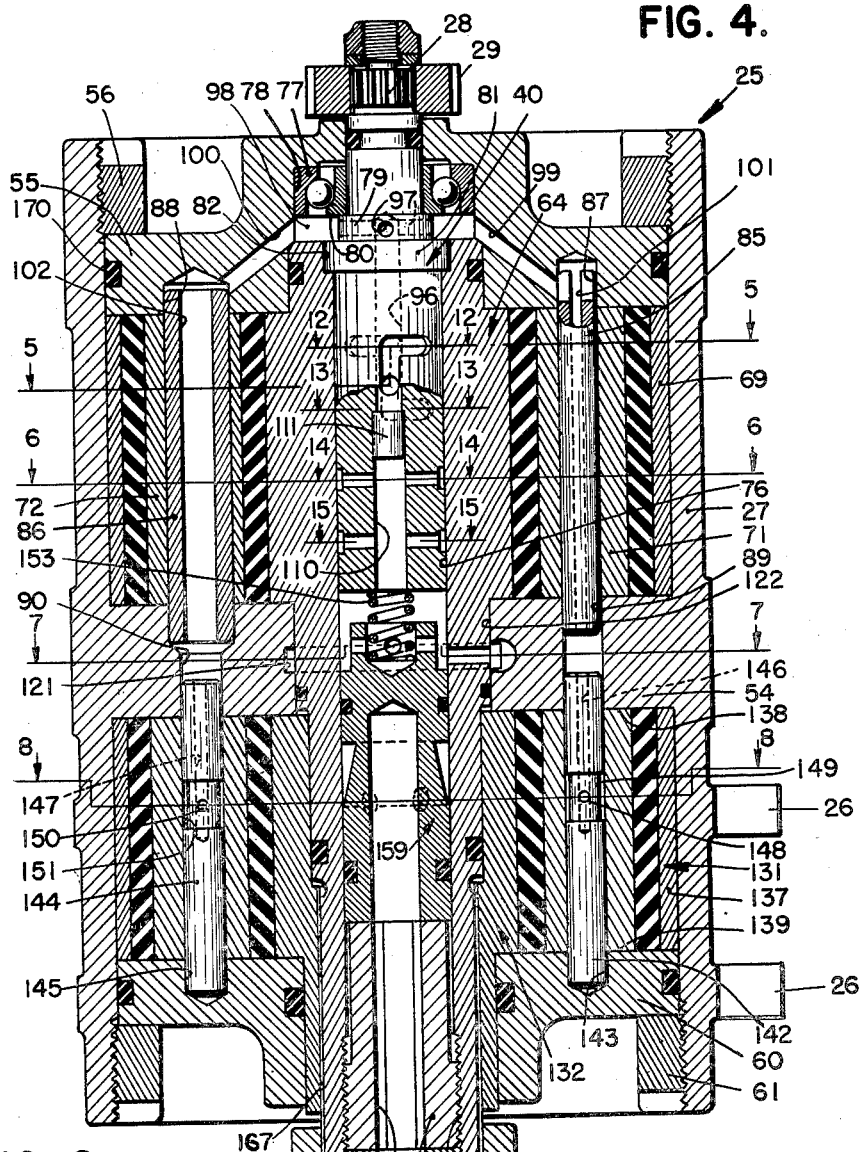
Figure 4 is a longitudinal cross-sectional view partly in elevation showing my steering motor and dampener.
Figure 9:
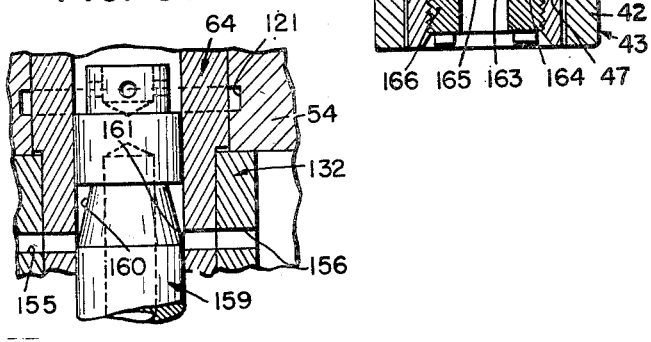
Figure 9 is a cross-sectional view partly in elevation taken on the line 9—9 of Figure 8.

Referring particularly to Figure 1, an airplane landing wheel 20 is mounted in the fork 21 which is adapted to turn as a caster wheel about an upright axis 22 in the strut S which is connected to the body B of an airplane by the pivot 23, a retracting arm 24 being suitably attached to the strut S to provide means for retracting the entire strut and wheel structure. The steering and dampening device 25 of my invention is attached by the ears 26 extending laterally from the body 27 which is generally cylindrical in shape. An upper end 28 of the rotary valve shaft 40 protrudes from the upper end of the body 27 and is provided with a spline attached driving gear 29, which is operatively meshed with the pinion 30 which is also rotatably mounted on the top surface of the body 27, this pinion being turned by the segmental gear 31 meshed therewith, the segmental gear being pivoted to turn on the pivot pin 32, a radial crank arm 33 being attached to turn with the segmental gear 31. A sheathed valve control cable 34 is mounted in the bracket 35 with one end of the cable connected to the crank arm 33 by the end fixture 36 which is pivoted to the outer end of the crank arm 33 by the pivot connection 37. There is also provided on the arm 33 a tension spring 38 operating against tension in the cable 34, being conveniently attached at one end to the pivot connection 37 and at the other to a side wall of the strut S, an eyelet 39 being provided for this connection. At the opposite or lower end of the cylindrical body 27, the extension 47 of the motor rotor 64 protrudes and is connected by a splined connection 41 to the hub 42 of the lever 43. The outer end of the lever 43 is pivotally connected to the lever 44 extending from the sleeve 45 by the link 46. Any angular movement of the lever 43 is transmitted to the fork 21 through the link 46, the lever 44 on the sleeve 45 through the elbow linkage 48 being connected between the ear 49 on the sleeve and corresponding ears 50 projecting from the fork 21.

The steering motor and dampener device 25 consists of an outer cylindrical housing 27 having attachment ears 26 by which the device is mounted on the strut S. The cylindrical housing is provided with a central partition member 54 extending inwardly from the walls of the housing with a central bearing opening 122 for the rotor 64. The steering motor is generally defined between the central partition member 54 and the upper closing member 55. The upper closing member 55 is held in place against the top edge of the liner 69 by the threaded locking ring 56 engaging the inside threaded wall of the cylindrical housing 27. The dampener chamber is defined by the central partition member 54 and the bottom closing member 60 which is held in place against the cylindrical liner 137 by the threaded bottom locking ring 61 engaging threads on the inside wall of the cylindrical housing 27.

The steering motor consists of the rotor 64 having diametrically opposed vanes 65 and 66 extending radially therefrom into the working chambers 67 and 68, which chambers are defined by the inside wall of the cylindrical liner 69, the lower face of the upper closing member and the upper face of the bottom closing member 60, and the two fixed partitions or dams 71 and 72 diametrically disposed in the working chamber, and held immovable by the pins 85 and 86 respectively, seated in holes 87 and 88 respectively in the upper closing member 55 and in holes 89 and 90 respectively in the central partition member 54.

The rotary valve shaft 40 is adapted to be turned in the bore 76 of the rotor 64 to control the coincidence of the valve ports in the rotor and the connecting conduits through the rotor. The upper end of the rotary valve shaft 40 is mounted in the bearing 77 which in turn is held in a recess 78 in the upper closing member 55 and is provided with an upthrust bearing collar 79 which abuts the face 80 of the bearing. The rotary valve shaft 40 is also provided adjacent the collar 79 with a downthrust collar 81 arranged to be seated in the recess 82 in the upper end of the rotor 64.

The rotary valve shaft 40 is provided with a pair of return conduits 92 and 92' whose outlets, on the opposite cylindrical faces, each consists of an upper horizontal groove 93 and 93' and a lower horizontal groove 94 and 94' with vertical connecting grooves 95 and 95' which lead into the return conduits 92 and 92' respectively, the effects of the angular positions of the grooves 93, 93', 94 and 94' being discussed further below.

The return conduits 92 and 92' connect to an axial bore 96 extending upwardly to the upthrust bearing collar 79 from which it is adapted to discharge hydraulic liquid through the radial holes 97 to the space 98 in the upper closing member 55 around said upthrust bearing collar 79 from which it is conducted through the conduits 99 and 100 in the upper closing member 55 leading respectively to the openings 101 and 102 in the bored pins 85 and 86 which openings communicate respectively with the holes 89 and 90 in the central partition member and then communicate through the check valve 103 with the return line coupling 104 which is connected by the flexible hose 105 to the return line of the hydraulic system of the airplane.

The rotary valve shaft 40 is also provided with pairs of radial holes 106, and 107, 108 and 109, which are interconnected to the central bore 110 in the lower end of the rotary valve shaft 40, a tightly fitting plug 111 being provided in the central bore 110 to separate the feed line portion of central bore 110 from the return line portion 96. The outer ends or ports for the holes 106, 107, 108, and 109 on the surface of the rotary valve shaft are enlarged to form grooves 112, 113, 114, and 115 respectively longer than the corresponding holes 116, 117, 118, and 119 through the rotor 64, the purpose of which will be explained below.

The central bore 110 in the lower end of the rotary valve shaft 40 is connected to the high pressure feed line through the annular groove 121 in the central partition member 54 in the periphery of the bearing opening 122. The annular groove 121 is connected for flow of pressure liquid to a check valve 125, through the pressure line fitting 126 and the flexible hose 127 leading to the pressure side of the hydraulic system of the plane.

The dampener 131 generally consists of a rotor 132 having a pair of diametrically opposed vanes 133 and 134 working in opposed segmental working chambers 135 and 136 defined by the cylindrical liner 137, the lower face 138 of the central partition member 54, and the upper face 139 of the bottom closing member 60. Fixed dams or partitions 140 and 141 are provided at diametrically opposite positions, these positions coinciding generally with the angular positions of the fixed dams 71 and 72 in the steering motor portion of the body 27. The dams 140 and 141 are held in fixed position respectively by the bored dowel pins 142 and 144 which are seated respectively in the holes 89 and 90 in the central partition member 54, and in holes 143 and 145 in the bottom closing member 60. The bores 146 and 147 in the dowel pins 142 and 144 respectively are connected hydraulically through the hole 90 to the return hydraulic line of the hydraulic system. Openings 148 and 149 connected with the bore 146 make hydraulic liquid connection respectively with the working chambers 135R and 136R of the dampener device 131, and openings 150 and 151 connected with the bore 147 make hydraulic connection respectively with the working chambers 135L and 136L, check valve means 152 being provided to check the flow of liquid out of the working chambers, and to insure that the chambers are full of liquid at all times.

Each check valve means 152 consists of a valve cup 172 having a groove 173 in the outer flat surface 174, this groove being provided with a rubber ring 175 vulcanized in the groove and extending above the surface 174. The cup 172 is provided with peripheral holes 176 communicating with the space outside the ring 175 above the flat surface 174. A retainer ring 177 is threaded into the threaded hole 178 in the dam, adjusted to allow longitudinal movement of about .005 inch of the cup.

Two pairs of radial holes 155 and 156, 157 and 158 are provided in the rotor 132, being interconnected through a metering valve. The metering valve consists of the metering valve stem 159 which is provided with a tapered groove 160 arranged so that the longitudinal movement of the metering valve stem 159 more or less opens or closes the annular passageway 161 connecting the radial holes 155, 156, 157, and 158. The metering valve stem 159 is positioned longitudinally by the threaded metering plug 163 which is threaded into the threaded opening 164 in the extension 47 of the rotor 64 of the steering motor. A coil spring 153 is provided between the upper end of the valve stem 159 and the rotary valve shaft 40. The metering plug 163 may be turned by means of a tool inserted in the multi-sided bore 165 which is accessible from the lower end of the device. After adjustment of the stem 159, its position is maintained by the lock plug 166. The extension of the steering rotor 64 is connected to the rotor 132 of the dampener by means of a spline 167 which extension is also used for connection to the hub of the lever 43.

Gaskets or O rings are provided throughout the hydraulic mechanism in grooves 170 to prevent leakage between the parts in surface contact, both static and moving.

The dampener is arranged to operate at all times under the hydraulic pressure of the return lines of the hydraulic system and the movement of the vanes 133 and 134 either from oscillation by shimmying or by sudden movement of the steering rotor in either direction is damped by the movement of the vanes.

Figure 17:
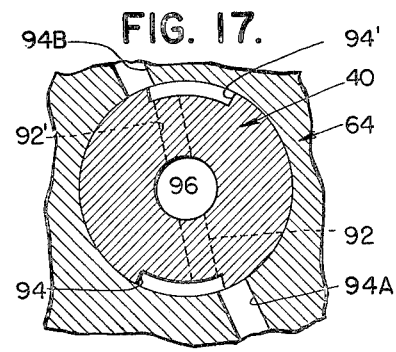
Figure 17 is a fragmentary cross-sectional view similar to Figure 13, shown with the relief ports in the position for a left hand turn with the relief ports registering with the openings in the rotor to the working chambers.
Figure 14:
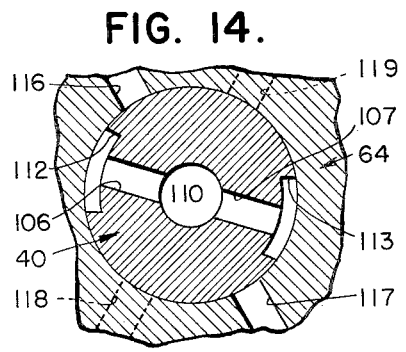
Figure 14 is a fragmentary cross-sectional view taken on the line 14—14 of Figure 4.
Figure 18:
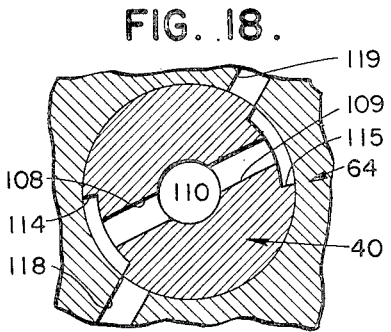
Figure 18 is a fragmentary cross-sectional view similar to Figure 15 with the pressure port about to register with the passage to the working chamber, and corresponding to the same relative position of the valve shaft and the relief ports as in Figure 17.
Figure 15:
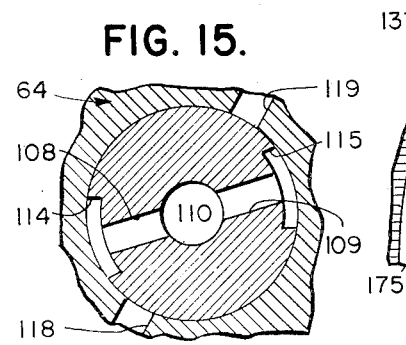
Figure 15 is a fragmentary cross-sectional view taken on the line 15—15 of Figure 4.
Figure 19:
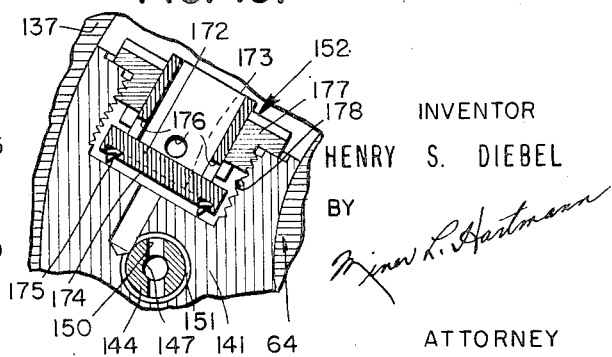
Figure 19 is an enlarged cross-sectional view of the check valves in the dampener.

The operation of the steering motor will be best understood by reference to Figures 12 to 19. The neutral or locked position of the valves and motor rotor are thereshown in Figures 12, 13, 14 and 15, the relief valving for controlling right turns being shown in Figure 12; the feed pressure valving for controlling right turns being shown in Figure 14; the relief valving for controlling left turns being shown in Figure 13; and the feed pressure valving for controlling left turns being shown in Figure 15. In Figure 17, is shown the position of the relief valving when the relief ports 94 and 94' register respectively with the passages 94A and 94B to the working chamber, and in Figure 18 is shown the corresponding position of the feed pressure valving, with the feed pressure ports 114 and 115 for left turning being about to enter into register respectively with the passages 118 and 119 into the working chamber. Further rotation of the valve shaft 40 in counterclockwise direction will effect registration of the feed pressure ports 114 and 115 with the passages 118 and 119 causing turning of the rotor 64 which then cuts off the feed pressure and locks the rotor, until the valve shaft 40 is further turned to registration of the ports 114 and 115 and passages 118 and 119 to further turn the rotor.

Figure 5:
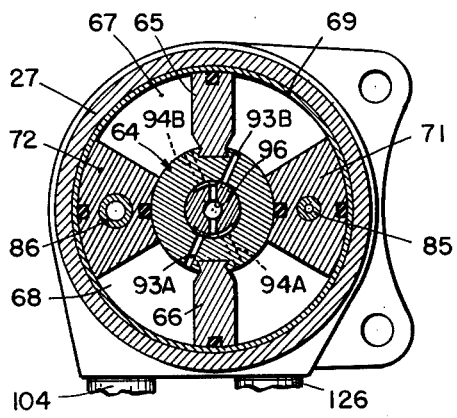
Figure 5 is a cross-sectional view taken on the line 5—5 of Figure 4.
Figure 7:
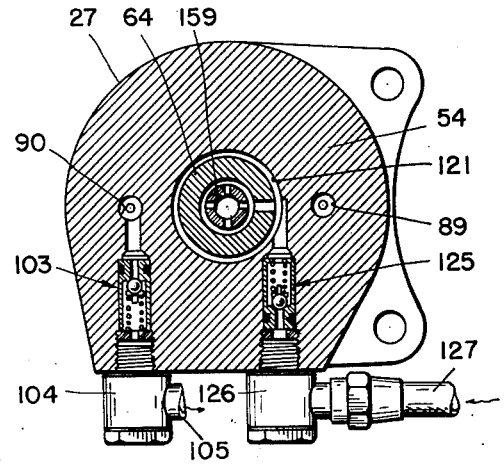
Figure 7 is a cross-sectional view taken on the line 7—7 of Figure 4.
Figure 6:
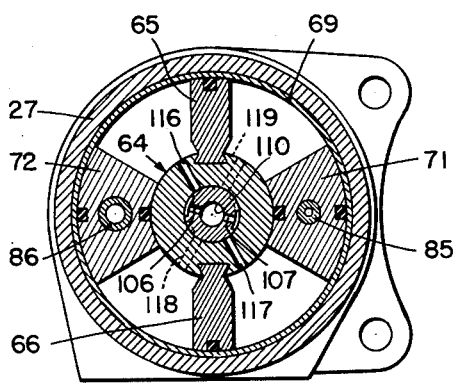
Figure 6 is a cross-sectional view taken on the line 6—6 of Figure 4.
Figure 8:
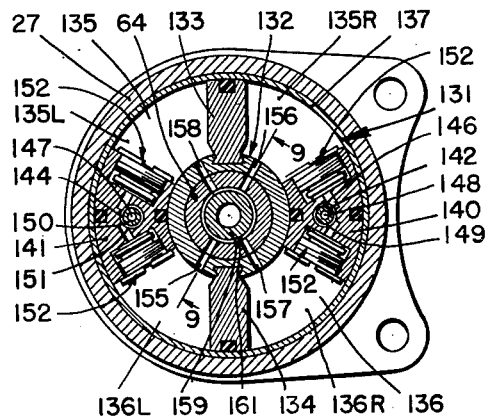
Figure 8 is a cross-sectional view taken on the line 8—8 of Figure 4.
Figure 10:
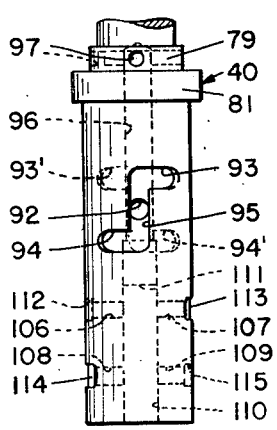
Figure 10 is a side elevational view of the steering valve shaft.
Figure 11:
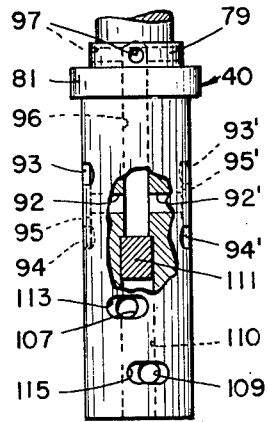
Figure 11 is a side elevational view of the steering valve shaft taken at right angles to the position shown in Figure 10, and with parts broken away.
Figure 12:
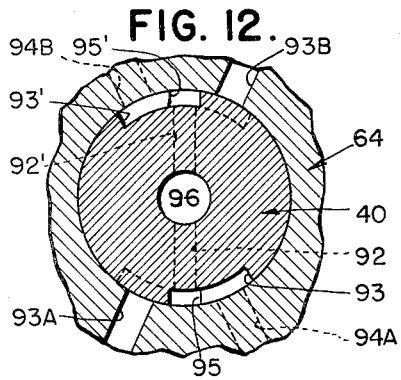
Figure 12 is a fragmentary sectional view through the steering valve shaft and rotor on the line 12—12 of Figure 4.
Figure 16:
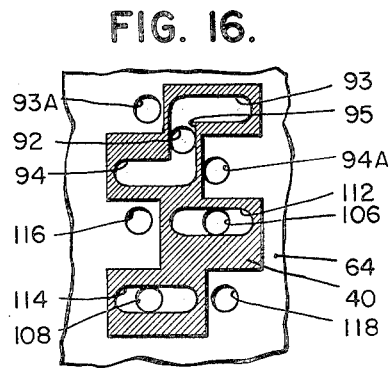
Figure 16 is a schematic view of the port relations of the steering valve and the rotor.
Figure 13:
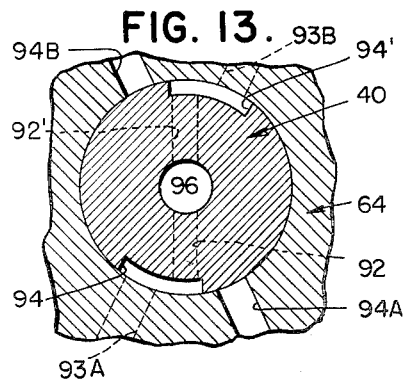
Figure 13 is a fragmentary cross-sectional view taken on the line 13—13 of Figure 4.

If the wheel is, for example, turned to the extreme left, and the pressure system is shut off by the pilot, preparatory to leaving the plane, the wheel stays at its last position before the pressure was shut off. When the pressure is restored in the system for example by the pilot returning and preparing to move the plane, the turned wheel will automatically return to normal position, which is the straight-ahead position to which the pilot's pedal controls automatically return when he removes his foot. This results from the use of elongated ports in the rotary valve mechanism. For example: if as in taxi-ing, the pilot were making a left turn, his foot would have been urging the foot pedal to the left. Then if the fluid system were cut off, upon removal of the pilot's foot from the pedal, the pedal would resume a neutral position, the pedal arrangement being one of the conventional self-centering type. Then, through cable 34, lever 33, gears 31, 30, and 29, the motor valve shaft 40 would be rotated to its 12 o'clock (neutral) position as shown in Figures 12, 13, 14, and 15. The returning of the pilot's foot pedal to the neutral position has no effect other than returning the motor valve shaft 40 to its neutral or 12 o'clock position and since under these conditions there is no fluid pressure to cause any other result, the system is hydraulically locked. Since no motion of the motor or dampener has resulted, the vanes 65 and 133 are still in a left turn position, for example at 11 o'clock. Vanes 66 and 134 are obviously in 5 o'clock position. With the motor valve shaft and vanes in this relation, the portion to the left, as viewed in Figures 5 and 6, of the vane 65 in working chamber 67 is now in communication with hose 127, also, the portion to the right of vane 66 in working chamber 68 is in communication with hose 127, leading to the pressure line. Further, the portion to the right of vane 65 in chamber 67 and the portion to the left of vane 66 in working chamber 68 is in communication with hose 105 leading to the return line.

When the fluid pressure system is again operative and pressure is established in hose 127, fluid will flow through fitting 126, check valve 125, passages 121, 110, 106 and 107, 112 and 113, 116 and 117 to the left portion of working chamber 67 and the right portion of working chamber 68, thus causing vanes 65 and 66 as well as vanes 133 and 134 to move clock-wise and will continue to move these vanes in this direction until passages 116 and 117 close off communication with passages 112 and 113. Simultaneously, the leading face of vanes 65 and 66 are advancing toward dams 71 and 72, respectively, thereby forcing fluid out through passages 93A and 93B, 93 and 93', 95 and 95', 92 and 92', respectively and through passages 96, 97, 98, 100, 102, 90, through check valve 103, fitting 104 and hose 105 to the fluid system reservoir. The vanes 65 and 66 being integral respectively with vanes 133 and 134, the latter also move clock-wise, the fluid from dampener chamber 135R being forced into chamber 136R, and the fluid from chamber 136L being forced into chamber 135L. In both cases, the fluid passes through groove 160 of the metering valve 159 which limits the speed of rotation as governed by the size of the orifice in metering valve 159. The chambers 135L and 136R are under reduced pressure during the rotation of the vanes for the period just described. Each of the chambers 135L, 136L, 135R and 136R are at all times in communication with each other through the metering valve 159 and any unbalanced pressure in either chamber is equalized as soon as rotation stops.

In the ordinary turning and dampening operations, a rotation of the motor valve 40 will cause the wheel 20 to be turned on the castering axis and the dampener will follow the motor valve, centering its vanes in the chamber at any position taken by the motor valve shaft. The dampener vanes, if acted on by any force tending to cause the wheel 20 to waver or shimmy, will resist such wavering or shimmying by virtue of the frictional resistance of exchange of fluid from the leading sides of the dampener vanes to the trailing sides through the adjustable metering valve 159. If such action caused the wheel 20 to continue to turn on its castering axis, the rotor 64 would be rotated with respect to the motor valve 40 so as to cause the registration of the fluid pressure ports of the motor valve 40 and the rotor 64, thereby returning the wheel to its predetermined position as established by the position of the motor valve shaft 40.

Summarizing, the motor valve shaft is self-centering at 12 o'clock by virtue of the self-centering foot pedal; the vanes are self-centering with respect to the motor valve regardless of the position of the motor valve shaft by virtue of the relation of the ports 93A and 94A to the port 92 (see Figure 16); the ports 93B, 94B and 92' have identical relation but are positioned 180 degrees from those previously mentioned and function in the same manner.

The angular relations of the ports and openings between the valve shaft 40 and the rotor 64 are preferably as shown in the drawings, particularly Figures 12 to 18, with the relief valves being opened about 5° ahead of the introduction of pressure liquid. The pressure groove ports 112, 113, 114 and 115 in the rotor valve shaft, and the relief valve grooves 93, 93', 94, and 94' are of sufficient length so that the rotor may be turned about 30° in either direction.

For right or left turning, the steering motor rotor 64, and the wheel 20 turn with the fork 21 in response to movements of the valve control cable 34 through the motor means hereinbefore described.

The advantages of my steering motor for airplane wheels will be apparent. The dampener is effective at all positions of the steering rotor so that sudden direction changes or shimmying are avoided. The dampener may be independently adjusted for the particular plane or conditions of operation to give the desired dampening. The dampener liquid is under the pressure of the return hydraulic system and therefore is constant and does not work against the feed pressure which acts on the vanes to provide the steering force. The steered wheel returns to the normal position upon restoring the hydraulic pressure regardless of the position in which the wheel was left when hydraulic pressure was shut off by the pilot.

I claim:

1. In a steering motor means for castered airplane landing wheels, a body adapted to be mounted on a strut upon which said castered wheel is mounted; a rotary piston and cylinder means arranged vertically in said body; a rotor for said rotary piston and cylinder means having upper and lower axial extensions mounted in bearings in said body, and having two diametrically opposed rotary piston vanes attached thereto, said rotor having an axial bore and radial holes connecting said axial bore and the working chambers on both sides of both vanes; a valve shaft adapted to be mounted for turning in the axial bore of said rotor, said shaft having pressure and relief conduits connecting at times with the radial holes in said rotor; said rotor radial holes and said valve shaft conduits being disposed to cause turning of said rotor to the left or to the right when hydraulic pressure liquid is admitted on one side or the other of said vanes after hydraulic liquid on the opposite sides of said vanes is released, when said valve shaft is turned to the right or left relative to said rotor; means for turning said valve shaft; and hydraulic dampening means for said steering motor said means being hydraulically connected to said relief conduits and adapted to operate under the pressure conditions of said relief conduits.

2. In a steering motor means for castered airplane landing wheels, a body adapted to be mounted on a strut upon which said castered wheel is mounted; a rotary piston and cylinder means arranged vertically in said body; a rotor for said rotary piston and cylinder means having upper and lower axial extensions mounted in bearings in said body, and having two diametrically opposed rotary piston vanes attached thereto, said rotor having an axial bore and radial holes connecting said axial bore and the working chambers on both sides of both vanes; a valve shaft adapted to be mounted for turning in the axial bore of said rotor, said shaft having pressure and relief conduits connecting at times with the radial holes in said rotor; means for turning said valve shaft; and hydraulic dampening means for said steering motor said means being hydraulically connected to said relief conduits and adapted to operating under the pressure conditions of said relief conduits.

3. In a steering motor means for castered airplane landing wheels, a cylinder having end closures and fixed partitions adapted to form a pair of diametrically opposed segmental working chambers; a rotor having upper and lower axial extensions mounted in bearings in said end closures, and having two diametrically opposed rotary piston vanes extending therefrom, said vanes being adapted to oscillate between said fixed partitions, and said rotor having an axial bore and holes connecting said axial bore and said working chambers on both sides of both vanes; a valve shaft adapted to be mounted for turning in the axial bore of said rotor, said shaft having pressure and relief conduits connecting at times through radial pressure and relief ports with the radial holes in said rotor said ports being disposed so that the relief ports are connected to said relief conduits in advance of the connection of said pressure ports to said pressure conduits; means for turning said valve shaft; lever means operatively connected to said lower rotor extension adapted to steer said castered airplane wheel; and hydraulic dampening means for said steering motor said means being hydraulically connected to said relief conduits and adapted to operate under the pressure conditions of said relief conduits.

4. In a steering motor means for castered airplane landing wheels adapted to be mounted adjacent the turning axis of said castered wheel and having a steering motor rotary piston and cylinder means for turning a rotor shaft, with a valve shaft adapted to be mounted for turning in the axial bore of said rotary piston, said valve shaft having pressure and relief radial conduits connecting at times with the holes in said rotor controlling the flow of pressure liquid to and from said steering motor rotary piston and cylinder means; means to dampen sudden movements of said rotary piston comprising vanes attached to said rotor shaft and adapted to turn in segmental dampener working chambers arranged around said rotor shaft, said dampener working chambers being separate from said steering motor and said dampener working chambers having opposed fixed end partitions, metering valve means adapted to control the flow of hydraulic liquid between said dampener chambers; and means to apply hydraulic liquid under the pressure of said relief conduits to both sides of said vanes.

5. In a steering motor means for castered airplane landing wheels, a cylinder having end closures and a partition dividing said cylinder longitudinally into a steering motor portion and a dampener portion, each portion having two fixed partitions adapted to form a pair of diametrically opposed segmental working chambers; a rotor extending through said steering motor portion and said dampener portion, and having upper and lower axial extensions mounted in bearings in said end closures, said rotor having diametrically opposed rotary piston vanes attached thereto in both said steering motor portion and said dampener portion, said vanes being adapted to oscillate between said fixed partitions, and said rotor having an upper axial bore and radial holes connecting said upper axial bore and the working chambers in said steering motor portion, and having a lower axial bore and lower radial holes connecting said lower axial bore and the working chambers in said dampener portion on both sides of said vanes; a valve shaft adapted to be mounted for turning in the upper axial bore of said rotor, said valve shaft having pressure and relief conduits connecting at times with the radial holes in said rotor in the steering piston portion; a metering valve shaft adapted to interconnect said lower radial holes; conduit means to hydraulically connect said dampener working chambers with said relief conduits in said valve shaft; means for turning said valve shaft; and lever means operatively connected to said lower rotor extension adapted to steer said castered airplane wheel.

6. In a steering motor means for castered airplane landing wheels; a cylinder having end closures and a partition dividing said cylinder longitudinally into a steering motor portion and a dampener portion, each portion having two fixed partitions adapted to form a pair of diametrically opposed segmental working chambers; a rotor extending through said steering motor portion and said dampener portion, and having upper and lower axial extensions mounted in bearings in said end closures, said rotor having diametrically opposed rotary piston vanes attached thereto in both said steering motor portion and said dampener portion, said vanes being adapted to oscillate between said fixed partitions, and said rotor having an upper axial bore and radial holes connecting said upper axial bore and the working chambers in said steering motor portion, and having a lower axial bore and lower radial holes connecting said lower axial bore and the working chambers in said dampener portion on both sides of said vanes; a valve shaft adapted to be mounted for turning in the upper axial bore of said rotor, said valve shaft having pressure and relief conduits connecting at times with the radial holes in said rotor in the steering piston portion; a metering valve shaft adapted for longitudinal movement in said lower axial bore of said rotor, said shaft having a tapered annular metering slot adapted to interconnect said lower radial holes; check-valved conduit means to hydraulically connect said dampener working chambers with said relief conduits in said valve shaft; means for turning said valve shaft; and lever means operatively connected to said lower rotor extension adapted to steer said castered airplane wheel.

7. In a steering motor means for castered airplane landing wheels adapted to be mounted adjacent the turning axis of said castered wheel, hydraulic motor rotary piston and cylinder means for turning a motor shaft; control means including a valve shaft adapted to be mounted in the axial bore of said rotary piston, said shaft having pressure and relief conduits connecting at times with said rotary piston and cylinder means; and means to dampen sudden movements of said rotary motor shaft, said dampening means comprising a coaxial rotary piston and cylinder means operatively mounted on an extension of said motor shaft, said piston and cylinder means being hydraulically connected to said motor and relief conduit, and metering valve means adapted to control the flow of hydraulic fluid from one side of said dampener rotary piston to the other.

HENRY S. DIEBEL.

REFERENCES CITED

The following references are of record in the file of this patent:

UNITED STATES PATENTS

| Number | Name | Date |
|---|---|---|
| 1,051,054 | Anderson | Jan. 21, 1913 |
| 1,876,104 | Tucker | Sept. 6, 1932 |
| 2,260,979 | Morin et al. | Oct. 28, 1941 |
| 2,372,710 | Chisholm, Jr. | Apr. 3, 1945 |
| 2,383,773 | Chisholm, Jr. | Aug. 28, 1945 |